United States Patent
Fujiwaka

(10) Patent No.: US 9,600,311 B2
(45) Date of Patent: Mar. 21, 2017

(54) VIRTUAL-MACHINE MANAGING DEVICE AND VIRTUAL-MACHINE MANAGING METHOD

(71) Applicant: Masaya Fujiwaka, Tokyo (JP)

(72) Inventor: Masaya Fujiwaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/382,597

(22) PCT Filed: Jan. 25, 2013

(86) PCT No.: PCT/JP2013/000370
§ 371 (c)(1),
(2) Date: Sep. 3, 2014

(87) PCT Pub. No.: WO2013/132735
PCT Pub. Date: Sep. 12, 2013

(65) Prior Publication Data
US 2015/0052526 A1 Feb. 19, 2015

(30) Foreign Application Priority Data
Mar. 8, 2012 (JP) .................. 2012-052028

(51) Int. Cl.
*G06F 9/455* (2006.01)
*G06F 9/50* (2006.01)
*G06F 11/34* (2006.01)

(52) U.S. Cl.
CPC ........ *G06F 9/45533* (2013.01); *G06F 9/5088* (2013.01); *G06F 11/3433* (2013.01);
(Continued)

(58) Field of Classification Search
None
See application file for complete search history.

(56) References Cited

U.S. PATENT DOCUMENTS 8,175,863 B1* 5/2012 Ostermeyer ........ G06F 17/5009
703/13
2009/0133018 A1 5/2009 Kaneki
(Continued)

FOREIGN PATENT DOCUMENTS

EP    2 060 977 A1    5/2009
JP    2007-323245 A   12/2007
(Continued)

OTHER PUBLICATIONS

International Search Report corresponding to PCT/JP2013/000370, dated Mar. 12, 2013 (2 pages).
(Continued)

*Primary Examiner* — Lewis A Bullock, Jr.
*Assistant Examiner* — Bruce S Ashley
(74) *Attorney, Agent, or Firm* — Wilmer Cutler Pickering Hale and Dorr LLP

(57) ABSTRACT

Provided is a virtual-machine managing device including: a model acquiring unit that acquires, for each server device, a performance model indicative of plural correspondent relationships between a workload amount and performance information on a workload; a performance-information acquiring unit that acquires the performance information on a virtual machine to be moved running on a current server device; a conversion unit that converts the performance information on the virtual machine to be moved into a combination of the workload amount and the workload characteristic value concerning the virtual machine to be moved, by using the performance model of the current server device; and an estimating unit that estimates performance information on the virtual machine to be moved on a destination server device serving as a candidate for a destination of movement of the virtual machine to be moved, by
(Continued)

applying the combination converted by the conversion unit to the performance model of the destination server device.

7 Claims, 10 Drawing Sheets

(52) U.S. Cl.
CPC .... *G06F 11/3447* (2013.01); *G06F 2201/815* (2013.01); *G06F 2209/5019* (2013.01)

(56) References Cited

U.S. PATENT DOCUMENTS

| | | | |
|---|---|---|---|
| 2010/0083248 A1 | 4/2010 | Wood et al. | |
| 2011/0055377 A1* | 3/2011 | Dehaan | G06F 9/4856 709/224 |
| 2011/0126206 A1* | 5/2011 | Kato | G06F 1/206 718/103 |
| 2011/0131589 A1 | 6/2011 | Beaty et al. | |
| 2012/0023492 A1* | 1/2012 | Govindan | G06F 9/5083 718/1 |
| 2012/0324471 A1 | 12/2012 | Yanagisawa | |
| 2013/0055250 A1* | 2/2013 | Pechanec | G06F 11/3428 718/1 |
| 2013/0290959 A1 | 10/2013 | Beaty et al. | |

FOREIGN PATENT DOCUMENTS

| | | |
|---|---|---|
| JP | 2008-276320 A | 11/2008 |
| JP | 2009-123174 A | 6/2009 |
| JP | 2011-257792 A | 12/2011 |
| WO | WO-2011/093011 A1 | 8/2011 |

OTHER PUBLICATIONS

Mitsuru Yanagisawa, et al., "A Method for Estimated Performance of Virtual Machines by Common Index and Its Evaluation," IPSJ SIG Technical Reports, 2009-OS-110, Jan. 21, 2009, vol. 2009, No. 6, pp. 27-33.

Masaya Fujiwaka, et al., "Kyotsu Shihyo O Mochiita Fukusu Kaso Machine Dosaji ni Okeru Seino Mitsumori Hoshiki," Dai 73 Kai Zenkoku Taikai Koen Ronbunshu, Mar. 2, 2011, pp. 1-27 and 1-28, 5G-2.

Extended European Search Report issued by the European Patent Office for Application No. 13757898.5 dated Oct. 19, 2015 (7 pages).

Ghafoor, A. and Yang, J., "A Distributed Heterogeneous Supercomputing Management System," Computer, IEEE, vol. 26, No. 6, pp. 78-86 (Jun. 1, 1993).

* cited by examiner

FIG. 3

| WORKLOAD TYPE | CPU WORKLOAD |
|---|---|
| WORKLOAD CHARACTERISTIC | MEMORY SIZE |
| WORKLOAD AMOUNT THE NUMBER OF SAMPLINGS | 10 |
| WORKLOAD CHARACTERISTIC VALUE THE NUMBER OF SAMPLINGS | 10 |
| TYPE OF PERFORMANCE INFORMATION | PERCENTAGE OF CPU USED |

VIRTUAL-MACHINE MANAGING DEVICE AND VIRTUAL-MACHINE MANAGING METHOD

CROSS-REFERENCE TO RELATED APPLICATIONS

This application is a national stage application of International Application No. PCT/JP2013/000370 entitled "Virtual-Machine Managing Device and Virtual-Machine Managing Method," filed on Jan. 25, 2013, which claims the benefit of the priority of Japanese Patent Application No. 2012-052028, filed on Mar. 8, 2012, the disclosures of each of which are hereby incorporated by reference in their entirety.

TECHNICAL FIELD

The present invention relates to a technique of managing virtual machines.

BACKGROUND ART

With the widespread use of virtualization techniques, data centers or other facilities have been operating in a way such that resources of plural physical machines are managed in a centralized manner, and are treated as a shared resource pool. Further, with improvement in performance of virtualization, it has become possible that applications, which in the past had been difficult to be operated in virtual environments, can be operated in the virtual environments.

With techniques of moving virtual machines such as centralized management and live migration using the shared resource pool, it is possible to reduce the amount of electric power used in the system. This is because such a technique makes it possible to collect the virtual machines into a specific physical machine, thereby turning off the power supply consumed to the redundant servers. Further, by moving the virtual machines operating on the physical machine in the overloaded state to another physical machine, it is possible to prevent physical machines from being overloaded.

In the case where a certain virtual machine is moved to another physical machine, it is checked in advance to see if sufficient resources are available in the physical machine serving as the destination of movement. However, in an environment where physical machines having different performances coexist, there is a possibility that the amount of resource used by the virtual machine on a certain physical machine cannot be simply replaced with the amount of resource used on another physical machine. For example, if the clocks or the architecture of the central processing units (CPU) vary among the physical machines, the values of the percentages of CPU used differ from physical machine to physical machine.

In view of the facts described above, Patent Document 1 described below proposes a method in which the availability for processing performances in each of the physical servers is measured in the virtual server environments according to the same standard. More specifically, the method of Patent Document 1 below runs, on plural physical servers, performance-measuring virtual servers based on the same virtual server image including an operating system (OS) and a performance-measuring program, thereby collecting performance information measured by the performance-measuring virtual servers from each of the physical servers. With this method, it is possible to acquire the differences in availability of processing performance between physical servers according to the same standard on the basis of the difference of the collected performance information between the physical servers.

RELATED DOCUMENT

Patent Document

Patent Document 1: Japanese Patent Application Laid-open No. 2007-323245

SUMMARY OF THE INVENTION

Problem to be Solved by the Invention

In the method described above, each of the physical servers runs the performance-measuring virtual server based on the virtual server image having the same OS type as that of a virtual server to be deployed and the performance-measuring program for measuring performance information that matches the type of applications executed in the virtual server to be deployed, whereby the performance information is measured.

However, in the case where the characteristics of workload caused by the performance-measuring virtual server are different from those of the virtual server to be deployed, it is difficult for the method described above to estimate the performance of the virtual server to be deployed in an accurate manner. Here, the "characteristic of workload" represents a property concerning processing of workload. For example, even if the number of calculation processes is the same across workloads, a variation in the size of a memory used during the calculation processes has an effect on the cache hit ratio of the CPU, and possibly leads to a variation in the CPU utilization percentage, which indicates performances. Further, even if the amount of data transmitted is the same across the workloads, a variation in the size of a packet transmitted possibly leads to a variation in the performance. Similarly, even if the amount of data processed for the hard disk is the same across the workloads, a variation in the method of accessing disks (random accesses, sequential access, or other accesses) possibly leads to a variation in performances.

In general virtual environments, the CPU utilization percentage, the amount of network received-and-transmitted data, the amount of disk data read-and-written or other performance information can be measured, but it is not possible to observe the characteristics of workload such as what kind of processes each virtual machine performs.

The present invention has been made in view of the facts as described above, and provides a technique that, before a virtual machine is moved to a server device serving as the destination of movement, highly accurately estimates the performance of the virtual machine on the server device serving as the destination of movement.

Means for Solving the Problem

In order to solve the problem described above, each aspect of the present invention employs the following configurations.

The first aspect relates to a virtual-machine managing device. The virtual-machine managing device according to the first aspect includes: a model acquiring unit that acquires, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices; a performance-information acquiring unit that acquires performance information on a virtual machine to be moved running on a current server device; a conversion unit that converts the performance information on the virtual machine to be moved into a combination of the workload amount and the workload characteristic value concerning the virtual machine to be moved, by using the performance model of the current server device; and an estimating unit that estimates performance information on the virtual machine to be moved in case of running on a destination server device serving as a candidate for a destination of movement of the virtual machine to be moved, by applying the combination converted by the conversion unit to the performance model of the destination server device.

The second aspect relates to a virtual-machine managing method. The virtual-machine managing method according to the second aspect is performed by at least one computer and includes: acquiring, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices; acquiring the performance information on a virtual machine to be moved running on a current server device; converting the performance information on the virtual machine to be moved into a combination of the workload amount and the workload characteristic value concerning the virtual machine to be moved, by using the performance model of the current server device; and estimating performance information on the virtual machine to be moved in case of running on a destination server device serving as a candidate for a destination of movement of the virtual machine to be moved, by applying the converted combination to the performance model of the destination server device.

It should be noted that another aspect according to the present invention may include a program that causes at least one computer to realize the configuration of the first aspect, and a computer-readable storage medium that records such a program. This storage medium includes a non-transitory tangible medium.

Effect of the Invention

According to each of the aspects described above, it is possible to provide a technique that, before a virtual machine is moved to a server device serving as the destination of movement, highly accurately estimates the performance of the virtual machine on the server device serving as the destination of movement.

BRIEF DESCRIPTION OF THE DRAWINGS

The above-described object and other objects of the present invention, and features and advantages of the present invention will be made further clear by the preferred embodiment described below and the following drawings attached thereto.

FIG. 3 is a diagram illustrating an example of workload specifications performed in the virtual machine for measurement.

DESCRIPTION OF EMBODIMENTS

Figure 1:
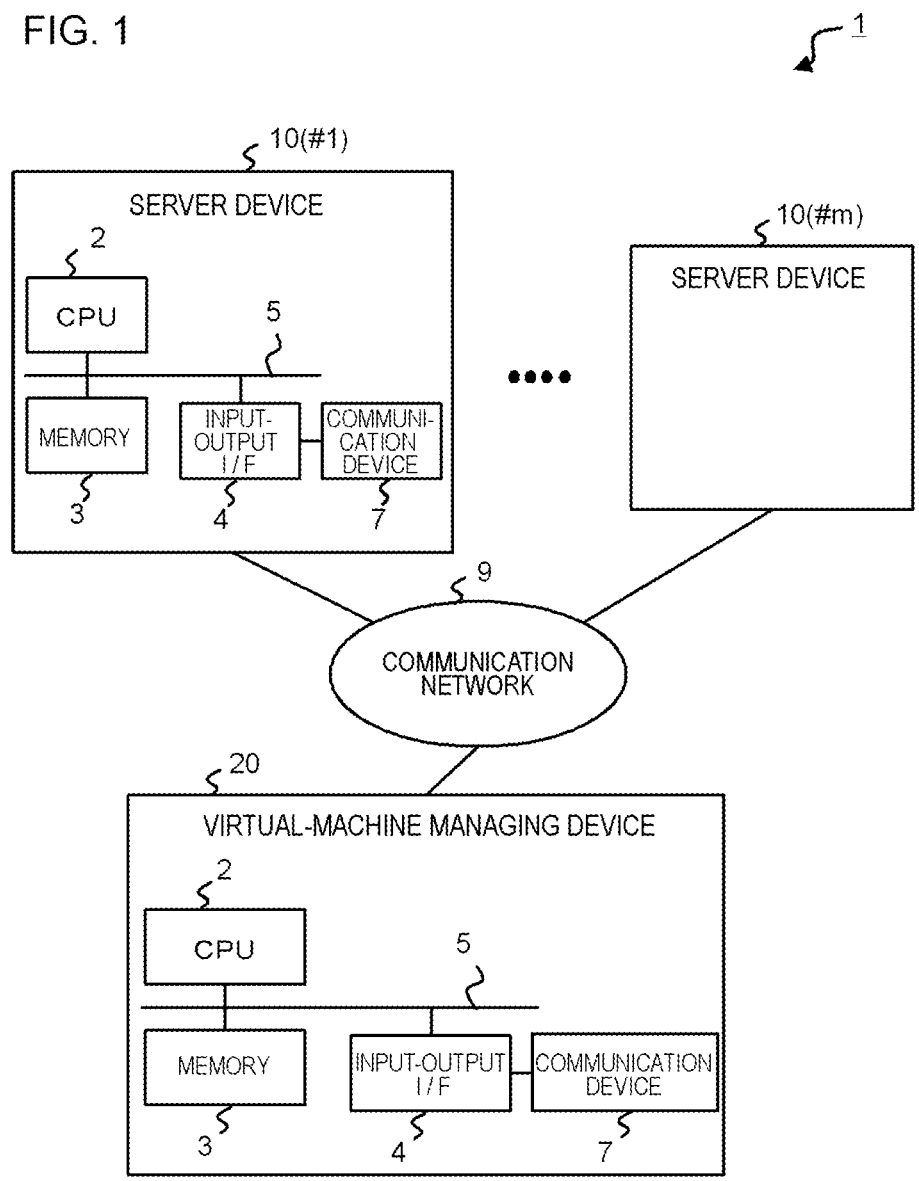
FIG. 1 is a schematic view illustrating an example of a configuration of a virtual-machine managing system according to the first exemplary embodiment.

Hereinbelow, an exemplary embodiment according to the present invention will be described. Note that the exemplary embodiment described below is merely an example, and the present invention is not limited to the configurations of the exemplary embodiment described below.

A virtual-machine managing device according to this exemplary embodiment includes: a model acquiring unit that acquires, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices; a performance-information acquiring unit that acquires the performance information on a virtual machine to be moved running on a current server device; a conversion unit that converts the performance information on the virtual machine to be moved into a combination of the workload amount and the workload characteristic value concerning the virtual machine to be moved, by using the performance model of the current server device; and an estimating unit that estimates performance information on the virtual machine to be moved in case of running on a destination server device serving as a candidate for a destination of movement of the virtual machine to be moved, by applying the combination converted by the conversion unit to the performance model of the destination server device.

The virtual-machine managing method according to this exemplary embodiment is performed by at least one computer and includes: acquiring, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices; acquiring the performance information on a virtual machine to be moved running on a current server device; converting the performance information on the virtual machine to be moved into a combination of the workload amount and the workload characteristic value concerning the virtual machine to be moved, by using the performance model of the current server device; and estimating performance information on the virtual machine to be moved in case of running on a destination server device serving as a candidate for a destination of movement of the virtual machine to be moved, by applying the converted combination to the performance model of the destination server device.

In this exemplary embodiment, a performance model of each server device is employed. This performance model indicates plural correspondent relationships concerning each server device among a workload amount, a workload characteristic value, and workload performance information. Here, the workload means a load of a process that uses a certain computer resource, and includes, for example, a CPU load, a network transmission load, a network reception load, a load of hard disk reading, a load of hard disk writing, and an image processing load. The workload is realized with a program that executes a specific process. The workload characteristic value is a value obtained by changing, into a form of data, a workload characteristic indicating a property concerning processing of workload as described above, and represents a parameter of the workload that has an effect on the performance for the workload.

In this exemplary embodiment, the performance information on a certain virtual machine on a certain server device is converted into a combination of the workload amount and the workload characteristic value by using the performance model of each server device as described above, whereby this combination is converted into the performance information on this virtual machine on another server device serving as a candidate for a destination of movement.

As described above, in this exemplary embodiment, the performance information, whose measurement results differ depending on the operating environment (server device) even if the virtual machine is the same, is converted into the combination of the workload amount and the workload characteristic value that does not depend on the operating environment. For this reason, such a combination of the workload amount and the workload characteristic value may be called common index data. Then, on the basis of the combination data converted, the performance information on this virtual machine on the destination server device is estimated. Thus, according to this exemplary embodiment, before the virtual machine is actually moved, it is possible to highly accurately estimate the performance of the virtual machine on the sever device serving as the destination of movement.

Further, data indicating the workload characteristic, which cannot usually be observed, are used for the above-described combination data which is the common index data. This means that this combination data indicates the performance of the virtual machine in a highly accurate manner. Further, it is possible to move and deploy each virtual machine to a server device that fits the characteristic of each of the virtual machines, whereby it is possible to appropriately use the resources in the entire system.

The exemplary embodiment described above shows an example of a simplified form of the exemplary embodiment. Hereinbelow, descriptions will be made of each exemplary embodiment, which further details the above-described exemplary embodiment. Each of the exemplary embodiments described below is an example in which the virtual-machine managing device and the virtual-machine managing method described above are applied to a virtual-machine managing system.

First Exemplary Embodiment

System Configuration

FIG. 1 is a schematic view illustrating an example of a configuration of a virtual-machine managing system 1 according to the first exemplary embodiment. The virtual-machine managing system 1 according to the first exemplary embodiment includes, for example, plural server devices, which are from 10 (#1) to 10 (#m) (m is a positive integer), and a virtual-machine managing device 20. Hereinafter, the plural server devices 10 (#1) to 10 (#m) are collectively referred to as server devices 10, except when these need to be separately specified.

The server device 10 and the virtual-machine managing device 20 are so-called computers, and each include, for example, a CPU 2, a memory 3, and an input-output interface (I/F) 4, which are connected to each other, for example, through a bus 5. The memory 3 includes, for example, a random access memory (RAM), a read only memory (ROM), a hard disk, and a portable storage medium. The input-output I/F 4 is connected to a communication device 7 that communicates with other devices through a communication network 9. Note that the input-output I/F 4 may be connected to a keyboard, a mouse or other devices that receive input of user operations, or a display device, a printer or other devices that provide users with information. The hardware configurations of the server device 10 and the virtual-machine managing device 20 are not limited.

The plural server devices 10 and the virtual-machine managing device 20 are connected to each other through the communication network 9 in a manner that they can communicate with each other. The communication network 9 includes, for example, a public network such as the Internet, a wide area network (WAN), a local area network (LAN), and a wireless communication network. Note that, in this exemplary embodiment, the communication mode between the server devices 10, or between each of the server devices 10 and the virtual-machine managing device 20 is not limited.

[Device Configuration]

Figure 2:
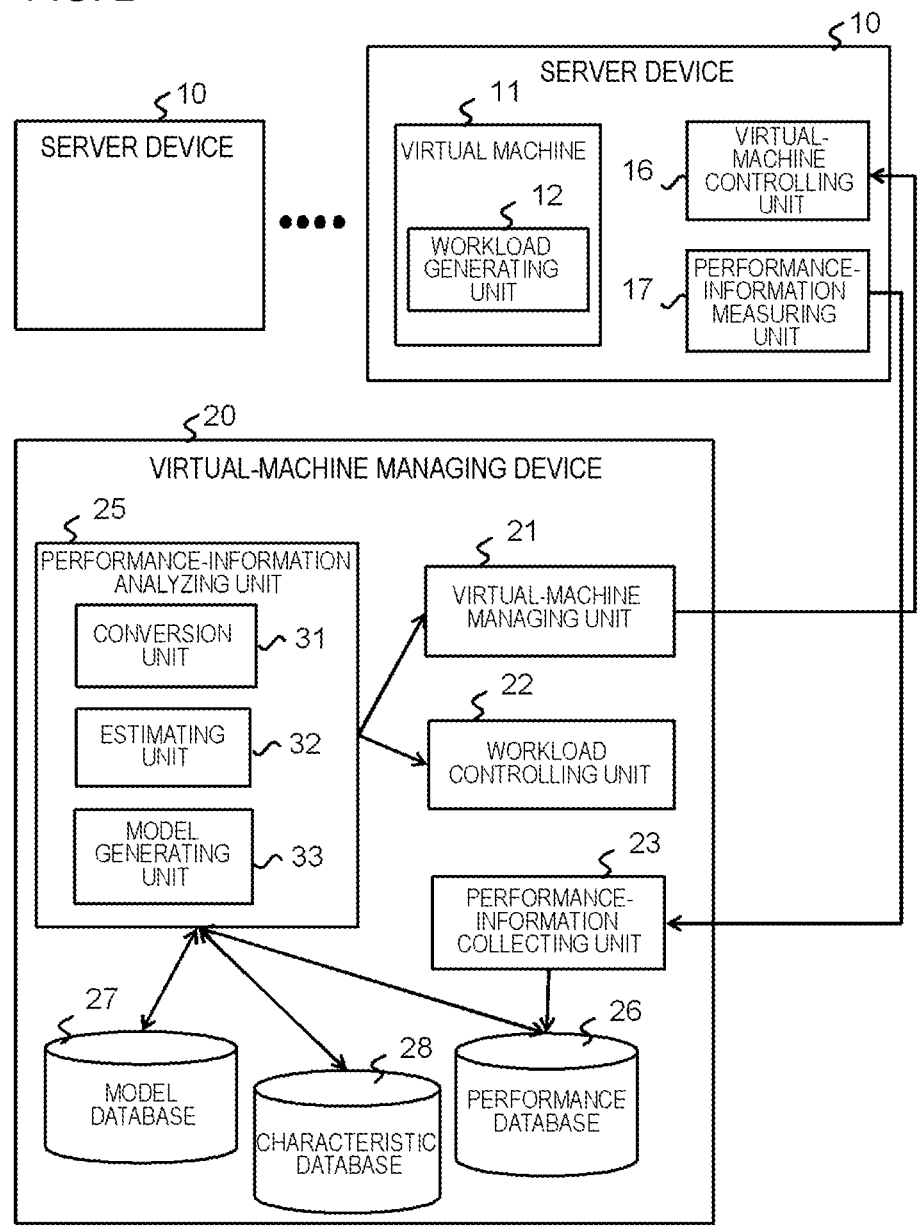
FIG. 2 is a schematic view illustrating an example of a process configuration of a server device and a virtual-machine managing device according to the first exemplary embodiment.

FIG. 2 is a schematic view illustrating an example of a process configuration of the server device 10 and the virtual-machine managing device 20 according to the first exemplary embodiment.

<Server Device>

The server device 10 includes, for example, a virtual-machine controlling unit 16, and a performance-information measuring unit 17, and is capable of operating at least one virtual machine 11. Each of these processing units and the virtual machine 11 are realized in the server device 10 with the CPU 2 running a program stored in the memory 3. For example, this program may be installed from a portable storage medium such as a compact disc (CD) and a memory card, or from other computers on the network through the input-output I/F 4, and may be stored in the memory 3.

The virtual-machine controlling unit 16, for example, activates the virtual machine 11, or allocates resources to the virtual machine 11.

The performance-information measuring unit 17 measures the performance information on the virtual machine 11 and the server device 10 itself. The performance information measured includes performance information on at least one resource type. In the case where the performance-information measuring unit 17 measures the performance information on plural resource types such as a CPU resource, a network resource, a disk resource, and a memory resource, it measures, for example, the CPU utilization percentage, the amount of network received, the amount of network transmitted, the amount of disk read, the amount of disk written, and the amount of memory used.

The virtual machine 11 activated by the server device 10 includes a virtual machine 11 for measurement. The virtual machine 11 for measurement may be installed in advance in the server device 10 at the time when its operation starts, or may be provided from the virtual-machine managing device 20 or other devices through the communication network 9.

The virtual machine 11 for measurement includes a workload generating unit 12. The workload generating unit 12 executes various modes of workloads on the virtual machine 11 for measurement. The workload generating unit 12 executes the workload corresponding to workload specifications acquired from a setting file or other devices. For example, in the case where workload types corresponding to two types of resource types are specified in the workload specifications, the workload generating unit 12 sequentially executes two types of workloads related to the resource types. In this case, for example, the CPU workload is realized with a calculation processing program, which does not perform any other processes that use other resource types (network transmission/reception or reading/writing disk).

FIG. 3 is a diagram illustrating an example of the workload specifications performed in the virtual machine 11 for measurement. As illustrated in FIG. 3, for example, a workload type, a workload characteristic, the number of sampling for the workload amount, the number of sampling for the workload characteristic value, and the type of performance information are specified as workload specifications. The workload type represents a resource type to which a workload is applied, and the type of performance information represents a mode of performance information measured by execution of this workload.

In the example illustrated in FIG. 3, the size of memory used which has an effect on the performance information on the CPU is specified as the characteristic of the CPU workload. Note that, although not illustrated in FIG. 3, as for the network transmission workload and the network reception workload, for example, the size of a packet transmitted/received at one time may be used as the workload characteristic value, and as for the disk reading workload and the disk writing workload, for example, a ratio of sequential access may be used as the workload characteristic value. Note that plural workload characteristics may be set for each of the workloads.

In the example illustrated in FIG. 3, the workload generating unit 12 sequentially executes 100 types of CPU workloads, which correspond to respective combinations of 10 types of workload amounts (the number of calculations) and 10 types of workload characteristic values (size of memory used). With this execution, the performance-information measuring unit 17 sequentially measures 100 pieces of performance information concerning the CPU workloads with different numbers of calculations and different sizes of memory used.

<Virtual-Machine Managing Device>

The virtual-machine managing device 20 includes, for example, a virtual-machine managing unit 21, a workload controlling unit 22, a performance-information collecting unit 23, a performance-information analyzing unit 25, a performance database (DB) 26, a model database (DB) 27, and a characteristic database (DB) 28. Each of these processing units is realized in the virtual-machine managing device 20 with the CPU 2 running a program stored in the memory 3. Further, this program may be installed, for example, from a portable storage medium such as a CD and a memory card, or from other computers on the network through the input-output I/F 4, and be stored in the memory 3.

The virtual-machine managing unit 21 controls, for example, arrangement of the plural virtual machines 11 to the server devices 10, allocation of the resources to each of the virtual machines 11, and rearrangement (movement) of the virtual machine 11. The virtual-machine managing unit 21 arranges the above-described virtual machine 11 for measurement to each of the server devices 10 serving as the target. Arrangement of the virtual machine 11 means making the virtual machine 11 operable on the server device 10, and in this exemplary embodiment, the specific method of the arrangement is not limited. For example, it may be possible to employ a configuration in which the virtual machine 11 for measurement is installed on each of the server devices 10, and the virtual-machine managing unit 21 instructs each of the server devices 10, which is to run the virtual machine 11 for measurement, to do so.

The virtual-machine managing unit 21 determines a server device 10 serving as the destination of movement for the virtual machine 11 to be moved from among the plural virtual machines 11, and then, moves this virtual machine 11 to be moved to this server device 10 serving as the destination of movement.

The workload controlling unit 22 controls the workload generated on the virtual machine 11 for measurement. For example, the workload controlling unit 22 acquires setting information on the workload specifications as illustrated as an example in FIG. 3, specifies the workload specifications to the workload generating unit 12 in the virtual machine 11 for measurement, and instructs execution of the workload. The setting information on the workload specifications may be retained in advance in the workload controlling unit 22, or may be inputted from a user interface device, or may be acquired from other devices.

The performance-information collecting unit 23 collects performance information measured by the performance-information measuring unit 17 of each of the server devices 10, and stores the collected performance information in the performance DB 26. In the case where the workload is executed on the basis of the example illustrated in FIG. 3, the performance-information collecting unit 23 collects, from each of the server devices 10, 100 pieces of performance information on the CPU workloads with different numbers of calculations and different sizes of memory used. The performance-information collecting unit 23 associates each piece of the collected performance information with the workload amount and the workload characteristic value corresponding to each piece of the performance information, and stores each piece of the performance information in the performance DB 26.

As described above, in this exemplary embodiment, the virtual-machine managing device 20 operates in collaboration with each of the server devices 10 in a manner such that can associate the performance information collected from each of the server devices 10 with the workload amount and the workload characteristic value corresponding to this performance information. This exemplary embodiment does not limit the mode of this collaborative operation. The mode of this collaborative operation includes, for example, a mode in which this association is made on the side of the virtual-machine managing device 20, and a mode in which this association is made on the side of each of the server devices 10.

In the former mode, the workload controlling unit 22 of the virtual-machine managing device 20 transmits, to the virtual machine 11 for measurement of each of the server devices 10, a workload-executing instruction including a certain combination of the workload amount and the workload characteristic value. Then, after the collection of the performance information corresponding to this combination is completed in the performance-information collecting unit 23, the workload controlling unit 22 transmits a workload-executing instruction including the next new combination to each of the virtual machines 11 for measurement. In the virtual machine 11 for measurement of each of the server devices 10, the workload generating unit 12 sequentially executes the workloads corresponding to the instructed combination of the workload amount and the workload characteristic value, and the performance-information measuring unit 17 sequentially measures the performance information on the workloads.

In the latter mode, for example, the workload controlling unit 22 transmits, to each of the virtual machines 11 for measurement, a workload-executing instruction further including a list of workload amounts and a list of workload characteristic values in addition to the information illustrated in FIG. 3. In each of the server devices 10, in accordance with the instruction, the workloads corresponding to each combination are sequentially executed, and the performance information at that time is sequentially measured. The performance-information measuring unit 17 of each of the server devices 10 generates information having the measured performance information and the combination of the workload amount and the workload characteristic value corresponding to this measured performance information, which are associated with each other, and transmits this generated information to the virtual-machine managing device 20.

Further, the performance-information collecting unit 23 collects the performance information on each of the virtual machines 11 other than the virtual machine 11 for measurement, from each of the server devices 10 on which each of the virtual machines 11 runs. Thus, the performance-information collecting unit 23 may be also called a performance-information acquiring unit.

The performance DB 26 stores, for each of the server devices 10, each piece of the performance information and the combination of the workload amount and the workload characteristic value corresponding to this performance information in a manner such that they are associated with each other. In the case where the performance information on plural resource types is measured, the performance DB 26 stores, for each of the resource types of the server devices 10, each piece of performance information and the combination of the workload amount and the workload characteristic value corresponding to this performance information in a manner such that they are associated with each other.

The performance-information analyzing unit 25 includes, for example, a conversion unit 31, an estimating unit 32, and a model generating unit 33.

The model generating unit 33 generates a performance model of each of the server devices 10 on the basis of the correspondent relationship between each of the combinations of the workload amount and the workload characteristic value and the performance information on each of the workloads, each of which is stored in the performance DB 26. For example, this performance model is expressed as a regression equation in which the workload amount and the workload characteristic value are used as an input, and the performance information corresponding to the combination thereof is used as an output. In this case, the model generating unit 33 generates the performance model by applying a multiple regression analysis using the information stored in the performance DB 26. With the performance information measured on the basis of the workload specifications of the example illustrated in FIG. 3, the model generating unit 33 generates a performance model in which the workload amount (the number of calculations) and the workload characteristic value (size of memory used) are set to the input, and the CPU utilization percentage is set to the output.

It should be noted that this exemplary embodiment does not limit the method of generating this performance model, provided that it indicates plural correspondent relationships among the workload amount, the workload characteristic value, and the performance information on the workload. Further, the model generating unit 33 may generate, for each of the plural resource types, a performance model indicating plural correspondent relationships among the workload amount, the workload characteristic value, and the performance information on the workload.

The model DB 27 stores the performance model of each of the server devices 10 generated by the model generating unit 33. Note that it is only necessary for the performance model stored in the model DB 27 to be generated once for each of the server devices 10 as long as the configuration of the server device 10 is unchanged. For example, it is only necessary that the performance model is generated once before the server device 10 starts its operation (for example, immediately after purchase).

The conversion unit 31 uses the performance model of the server device 10 on which the virtual machine 11 to be moved is to operate, to convert the performance information on the virtual machine 11 to be moved into a combination of the workload amount and the workload characteristic value concerning the virtual machine 11 to be moved. The performance information on the virtual machine 11 to be moved is collected by the performance-information collecting unit 23. The server device 10 on which the virtual machine 11 to be moved is to operate is identified on the basis of the source of acquisition of this performance information, or the management information on the virtual-machine managing unit 21. The conversion unit 31 also functions as the model acquiring unit since the performance model of the server device 10 is acquired from the model DB 27.

Incidentally, there are usually plural combinations of the workload amount and the workload characteristic value on the performance model described above even if the performance information is fixed. For example, in the case where the performance information indicating that the CPU utilization percentage is 50% is converted into the workload amount and the workload characteristic value of the CPU workload, it cannot be determined whether the CPU workload executes a calculation process having a low cache hit ratio and the reduced workload amount, or executes a calculation process having a high cache hit ratio and increased workload amount. This means that, in the case of the CPU utilization percentage being 50%, there are plural combinations of the workload amount and the workload characteristic value.

Figure 4:
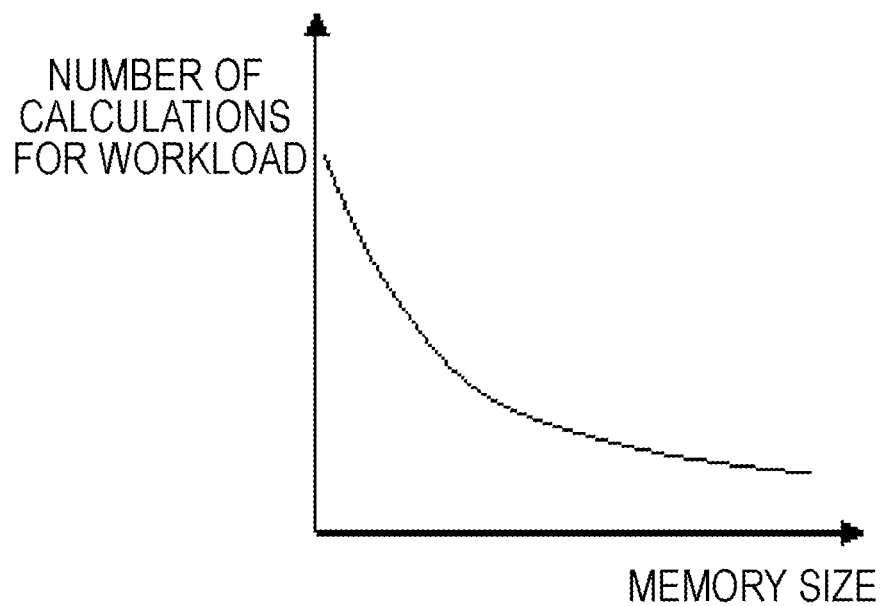
FIG. 4 is a diagram illustrating an example of a correspondent relationship between a workload amount (the number of calculations) and a workload characteristic value (memory size) in the case where the CPU utilization percentage (performance information) is fixed in a performance model concerning the CPU utilization percentage.

FIG. 4 is a diagram illustrating an example of a correspondent relationship between the workload amount (the number of calculations) and the workload characteristic value (memory size) in the case where the CPU utilization percentage (performance information) is fixed in the performance model of the CPU utilization percentage. As illustrated in FIG. 4, if the size of the memory used by the workload varies, the workload amount also varies even through the CPU utilization percentage is the same.

As described above, the characteristic DB 28 stores plural combinations of the workload amount and the workload characteristic value, which are converted from the performance information measured on a certain server device 10 and concern the virtual machine 11 to be moved. Thus, for the virtual machine 11 that has already been moved in the past, plural combinations of the workload amount and the workload characteristic value, which are converted from the performance information measured on the server device 10 on which this virtual machine 11 had been running before the movement, are stored in the characteristic DB 28. As described above, the characteristic DB 28 may be also called a characteristic-information storage unit.

The plural combinations of the workload amount and the workload characteristic value converted from the performance information by the conversion unit 31 and concerning a certain virtual machine 11 may be treated as discrete data such as array data, or may be treated as continuous data such as a function. The characteristic DB 28 stores data concerning these plural combinations with a data format treated in the virtual-machine managing device 20 as described above.

In the case where the virtual machine 11 to be moved has already been moved in the past, the conversion unit 31 determines one combination of the workload amount and the workload characteristic value concerning the virtual machine 11 to be moved, on the basis of the plural past combinations stored in the characteristic DB 28 and the plural combinations converted from the performance information measured on the server device 10 on which this virtual machine 11 is currently running. This can be realized, for example, by solving a simultaneous equation.

In the case where the virtual machine 11 has not been moved in the past, the conversion unit 31 determines one combination of the workload amount and the workload characteristic value, from the plural combinations converted from the performance information measured on the server device 10 on which this virtual machine 11 to be moved is currently running. More specifically, the conversion unit 31 selects any one combination from the plural combinations, or determines this one combination by averaging the plural combinations.

It should be noted that, in the case where the performance information acquired concerns plural resource types, the conversion unit 31 converts the performance information on each of the resource types into a combination of the workload amount and the workload characteristic value for each of the resource types for this virtual machine 11.

The estimating unit 32 applies the combination converted by the conversion unit 31 to the performance model of the destination server device 10 serving as a candidate for the destination of movement of the virtual machine 11 to be moved, thereby estimating the performance information on the virtual machine 11 to be moved running on the destination server device 10.

[Example of Operation]

Below, the virtual-machine managing method according to the first exemplary embodiment will be described with reference to FIG. 5 and FIG. 6. As described above, the virtual-machine managing method according to the first exemplary embodiment is divided into a preparation phase that lasts until the performance model of each of the server devices 10 is generated, and an operation phase in which a virtual machine 11 to be moved is moved to a certain server device 10 in a state where the performance model of each of the server devices 10 has been generated. For this reason, for each of the phases, the virtual-machine managing method according to the first exemplary embodiment will be described below.

Figure 5:
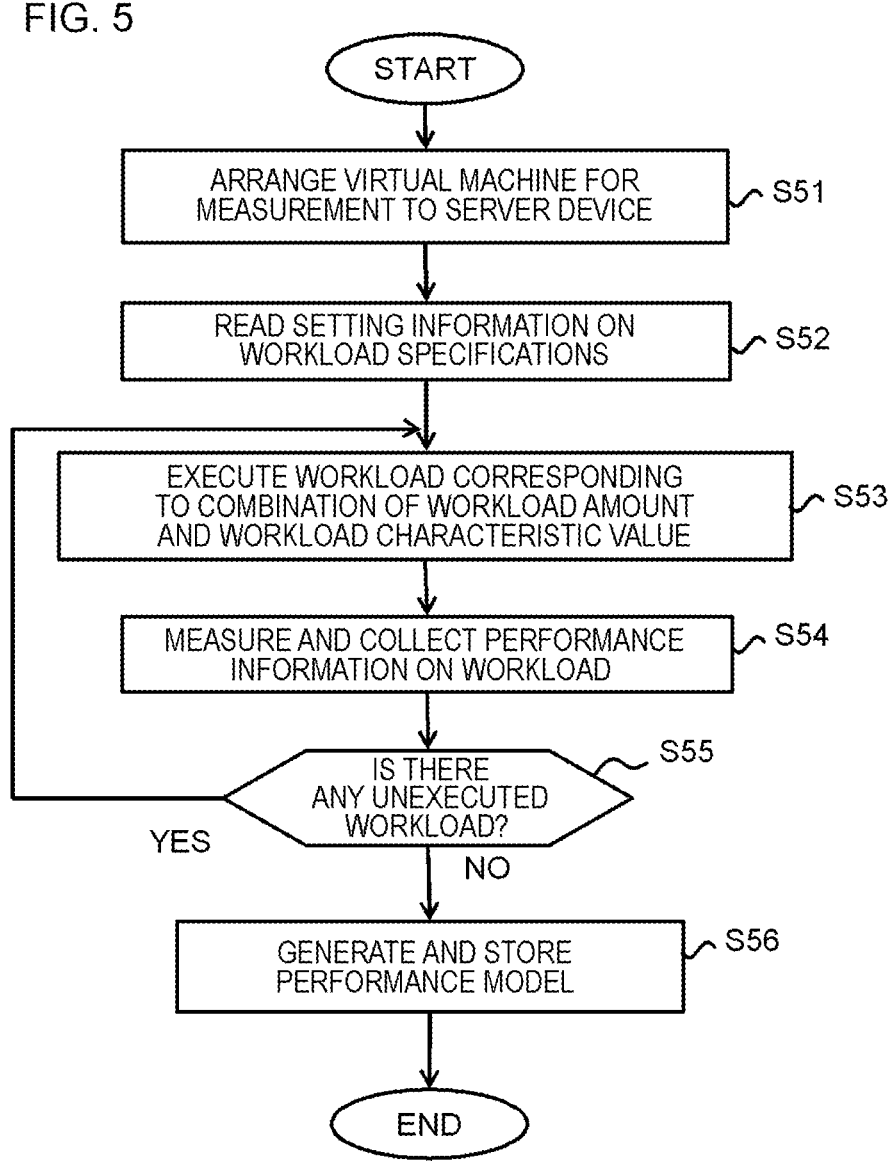
FIG. 5 is a flowchart showing an example of operations performed in a preparation phase by the virtual-machine managing device according to the first exemplary embodiment.

FIG. 5 is a flowchart showing an example of operations performed in the preparation phase by the virtual-machine managing device 20 according to the first exemplary embodiment. First, the virtual-machine managing device 20 arranges the virtual machine 11 for measurement, to each of the server devices 10 serving as the targets for generation of the performance model (S51).

Then, the virtual-machine managing device 20 reads the setting information on the workload specifications (S52), and determines a combination of the workload amount and the workload characteristic value concerning the workload to be executed. This combination data may be included in this setting information, or may be determined at random. The virtual-machine managing device 20 transmits the workload-executing instruction indicating the combination determined, to the virtual machine 11 for measurement on each of the server devices 10.

In accordance with this workload-executing instruction, the virtual machine 11 for measurement on each of the server devices 10 executes the workload corresponding to the combination of the workload amount and the workload characteristic value contained in this instruction (S53). Each of the server devices 10 measures the performance information on the workload executed (S54).

The virtual-machine managing device 20 collects the performance information on the workload measured in each of the server devices 10 (S54), and stores the collected performance information and the information on the combination of the workload amount and the workload characteristic value corresponding to this performance information in a manner such that they are associated with each other. The virtual-machine managing device 20 performs step S53 and step S54 described above for all the workloads indicated by the read setting information (S55; YES).

Upon completing the collection of the performance information on all the workloads (S55; NO), the virtual-machine managing device 20 generates the performance model of each of the server devices 10 on the basis of the information stored, and stores the generated performance model of each of the server devices 10 (S56).

It is only necessary for the preparation phase described above to be performed once for each of the server devices 10 if the configuration of the server device 10 is unchanged. For example, in the case where a new server device 10 is purchased and is introduced into the virtual-machine managing system 1, this preparation phase is performed once to this new server device 10 before the new server device 10 starts its operation.

Figure 6:
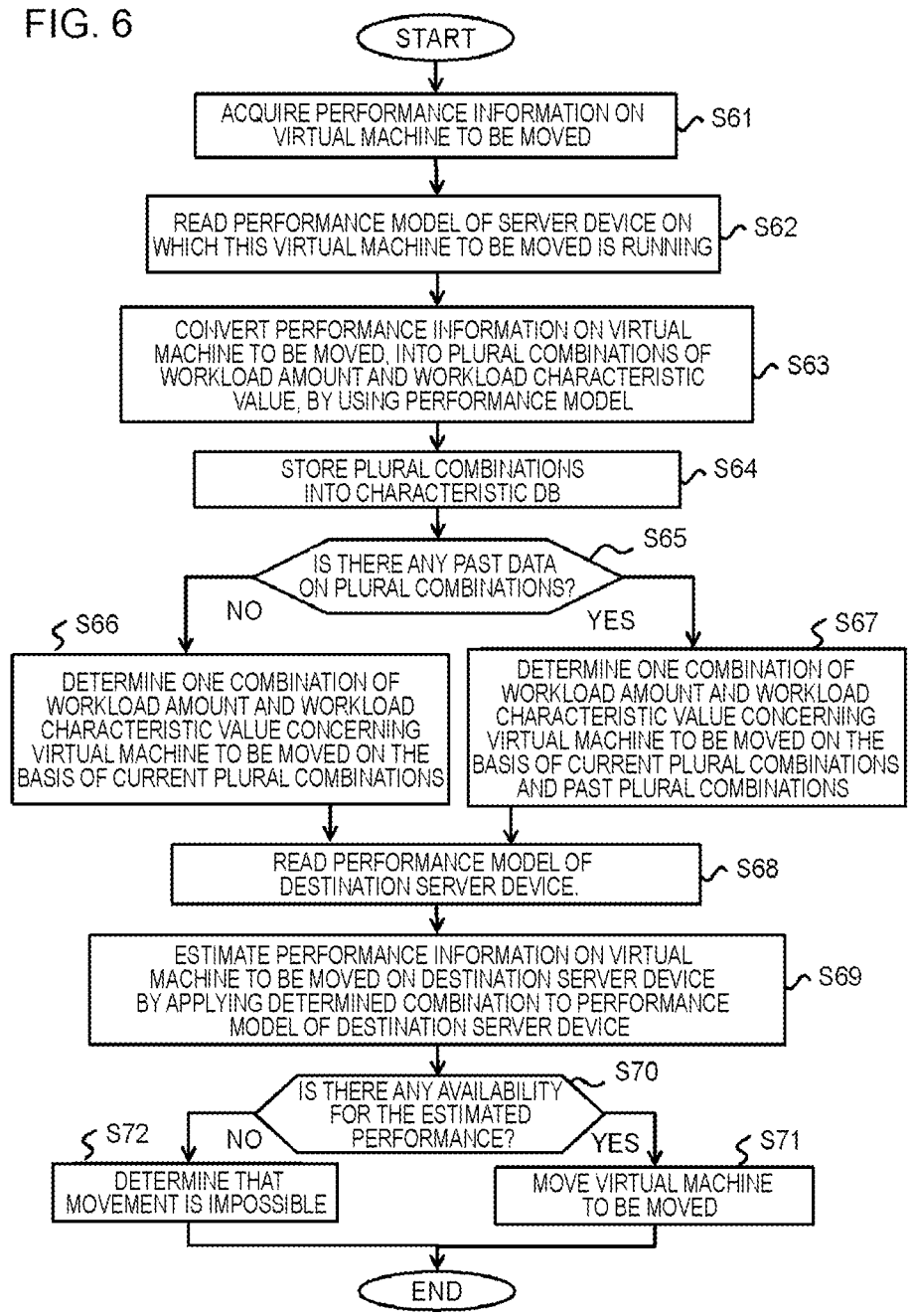
FIG. 6 is a flowchart showing an example of operations performed in an operation phase by the virtual-machine managing device according to the first exemplary embodiment.

FIG. 6 is a flowchart showing an example of operations performed in the operation phase by the virtual-machine managing device 20 according to the first exemplary embodiment. The operation phase illustrated in FIG. 6 is performed at the time of occurrence of a trigger to move the virtual machine 11 running in the virtual-machine managing system 1. This trigger includes, for example, maintenance of the server device 10, occurrence of overload in the server device 10, and unification of virtual machines 11 into a server device 10 for the purpose of energy saving. However, there is no limitation on conditions of this occurrence of the trigger.

The virtual-machine managing device 20 identifies a virtual machine 11 to be moved, and acquires the performance information on this virtual machine 11 to be moved (S61). The performance information on the virtual machine 11 to be moved is measured by the server device 10 (referred to as a current server device 10) on which this virtual machine 11 is currently running, and is collected by the virtual-machine managing device 20.

The virtual-machine managing device 20 reads the performance model of the current server device 10 (S62).

The virtual-machine managing device 20 uses the performance model concerning the current server device 10 to convert the performance information on the virtual machine 11 to be moved into plural combinations of the workload amount and the workload characteristic value concerning the virtual machine 11 to be moved (S63). The virtual-machine managing device 20 stores the discrete data or continuous data, which are the plural combinations, to the characteristic DB 28 (S64).

Then, in connection with the virtual machine 11 to be moved, the virtual-machine managing device 20 judges whether the data indicating the plural combinations converted in the past are stored in the character DB 28 (S65). The data indicating these plural combinations in the past are stored in the characteristic DB 28 in the case where this virtual machine 11 to be moved has been moved in the past, and correspond to the plural combinations converted from the performance information on the server device 10 on which this virtual machine 11 ran before the movement.

If the data indicating the plural combinations converted in the past are stored (S65; YES), the virtual-machine managing device 20 determines one combination of the workload amount and the workload characteristic value concerning this virtual machine 11 to be moved on the basis of the data indicating the plural combinations converted this time and the data indicating the plural combinations converted in the past (S67).

On the other hand, if the data indicating the plural combinations converted in the past are not stored (S65; NO), the virtual-machine managing device 20 determines one combination of the workload amount and the workload characteristic value concerning the virtual machine 11 to be moved, from the plural combinations converted this time (S66).

Then, the virtual-machine managing device 20 reads the performance model of the server device 10 (referred to as a destination server device 10) serving as a candidate for the destination of movement (S68).

The virtual-machine managing device 20 applies the combination of the workload amount and the workload characteristic value determined in step S66 or step S67 to the performance model of the destination server device 10, thereby estimating the performance information on the virtual machine 11 to be moved running on the destination server device 10 (S69).

The virtual-machine managing device 20 judges whether there is any available resource amount in the destination server device 10 that can carry the estimated performance information (S70), and if the available resource amount exists (S70; YES), this virtual machine 11 to be moved is moved to this destination server device 10 (S71).

On the other hand, if there is no available resource amount (S70; NO), the virtual-machine managing device 20 judges that this virtual machine 11 to be moved cannot be moved to this destination server device 10 (S72). If it is judged that the virtual machine 11 to be moved cannot be moved (S72), the virtual-machine managing device 20 may select another server device 10, and perform step S68 and thereafter to this server device 10.

In the example illustrated in FIG. 6, if it is judged in step S65 that the data on the plural combinations in the past are stored in the characteristic DB 28 (S65; YES), step S67 is performed. However, if step S67 has been already performed in the past for the target virtual machine 11, it is only necessary that one combination of the workload amount and the workload characteristic value determined in S67 in the past is used in the judgment over movement of this virtual machine 11. Further, in the example illustrated in FIG. 6, step S62 and step S68 are separately performed. However, these steps may be performed at the same time.

Operation and Effect of First Exemplary Embodiment

As described above, in the first exemplary embodiment, on each of the server devices 10, the virtual machine 11 for measurement is caused to run plural types of workloads corresponding to plural combinations of the workload amount and the workload characteristic value; the performance information on each of the workloads is measured; and in the virtual-machine managing device 20, the performance model indicating plural correspondent relationships among the workload amount, the workload characteristic value, and the performance information is generated for each of the server devices 10. In other words, according to the first exemplary embodiment, it is possible to automatically generate the performance model of each of the server devices 10.

Further, in the first exemplary embodiment, the data indicating plural combinations of the workload amount and the workload characteristic value converted from the performance information on the virtual machine 11 by using the performance model of the current server device 10 on which the virtual machine 11 runs are stored. This makes it possible to determine one combination of the workload amount and the workload characteristic value concerning this virtual machine 11 on the basis of the plural combinations converted at the time when judgment over movement was made in the past, and the plural combinations obtained through the current conversion. Since the past information is also used as described above, according to the first exemplary embodiment, it is possible to obtain a combination of the workload amount and the workload characteristic value indicating the performance of the virtual machine 11 in a highly accurate manner.

Further, the performance information on the virtual machine on the destination server device 10 is estimated on the basis of the combination. Thus, according to the first exemplary embodiment, it is possible to highly accurately estimate the performance of the virtual machine 11 at the destination. Further, according to the first exemplary embodiment, since the performance of the virtual machine 11 at the destination can be highly accurately estimated, it is possible to efficiently allocate the resource to the virtual machine 11, and prevent the server device 10 from overloading unintentionally resulting from the movement of the virtual machine 11.

Further, at the time of movement for the first time, the past information cannot be used, and hence, one combination of the workload amount and the workload characteristic value is determined from among the plural combinations converted by using the performance information on the current server device 10 and the performance model of the current server device 10. Thus, this combination related to the virtual machine 11 moved for the first time is information obtained on the basis of the performance model of the current server device 10, and hence, it is possible to achieve a certain level of accuracy, although accuracy is less than that obtained for the virtual machine 11 that has been moved in the past.

Second Exemplary Embodiment

There are various modes of virtual environments. Depending on the modes of the virtual environments, the performance information cannot be measured for each of the virtual machines 11. For example, with a layer configuration in which a guest OS runs on a host OS, in the case where a virtual machine with the guest OS performs an input/output process such as network or disk, this workload usually expands to the host OS. At this time, in the case where plural guest OSs run on a single host OS, only the total of workloads of the plural guest OSs is measured as the performance information on the host OS, and there is a possibility that the amount of contribution of one virtual machine 11 is unknown. It may be possible to estimate the property of the workload without using the information on the host OS, but the information on the host OS is important to make a highly accurate estimation.

Further, depending on the resource types, there are performance information that can be measured for each of the virtual machines 11, and performance information that cannot be measured for each of the virtual machines 11. For example, for the CPU utilization percentage, the performance information can be measured for each of the virtual machines 11, whereas, for the percentage of hard disk used, the performance information cannot be measured for each of the virtual machines 11, and measurement has to be made on a unit of a host OS.

In this regard, the second exemplary embodiment will be described as a mode that can treat the case where the performance information cannot be measured for each of the virtual machines 11 as described above. The virtual-machine managing system 1 according to the second exemplary embodiment has a configuration similar to that in the first exemplary embodiment. Further, the server device 10 and the virtual-machine managing device 20 according to the second exemplary embodiment each have a processing configuration similar to those in the first exemplary embodiment. Below, the second exemplary embodiment will be described with focus being placed on things different from those of the first exemplary embodiment, and explanation of the details same as those described in the first exemplary embodiment will not be repeated.

In the description below, only the performance information that cannot be measured for each of the virtual machines 11 is targeted. In the case where a resource type for which measurement can be made for each of the virtual machines 11 and a resource type for which measurement cannot be made for each of the virtual machines 11 coexist, it is only necessary that the performance information on the resource type for which measurement can be measured for each of the virtual machines 11 is processed in a similar manner to that in the first exemplary embodiment. Further, in the case where a server device 10 for which performance information can be measured for each of the virtual machines 11 and a server device 10 for which performance information cannot be made for each of the virtual machines 11 coexist, it is only necessary that the performance information measured in the former server device 10 is processed in a similar manner to that in the first exemplary embodiment. In other words, in such a coexisting environment, processes in the first exemplary embodiment described above and processes in the second exemplary embodiment described below are performed in a mixed manner.

In the server device 10 according to the second exemplary embodiment, the performance-information measuring unit 17 measures integrated performance information on a group of virtual machines 11 on a predetermined unit. In this specification, the predetermined unit means a unit in which the performance information can be measured. For example, with the layer configuration described above, the predetermined unit means a unit of host OS, and the performance-information measuring unit 17 measures the performance information on the host OS as the integrated performance information on the group of virtual machines 11 running on the host OS. With this configuration, the performance information on the host OS measured by the performance-information measuring unit 17 indicates the total of the performance information on all the virtual machines 11 running on this host OS, and is integrated performance information on the group of virtual machines 11 in the predetermined unit described above.

In the virtual-machine managing device 20 according to the second exemplary embodiment, the performance-information collecting unit 23 collects the performance information on the host OS measured by the performance-information measuring unit 17 described above, and extracts performance information corresponding to the amount of contribution of a certain virtual machine 11 from the collected performance information. The performance-information collecting unit 23 calculates the performance information corresponding to the amount of contribution of this virtual machine 11 on the basis of the amount of change in the performance information in association with the movement of the virtual machine 11. More specifically, the performance-information collecting unit 23 calculates the amount of decrease in the performance information before and after the movement of the virtual machine 11 on the basis of the performance information before and after the movement collected from the server device 10 (referred to as a previous server device 10) on which the virtual machine 11 ran before the movement, and acquires this amount of decrease as the performance information on this virtual machine 11 on the previous server device 10. Further, the performance-information collecting unit 23 calculates the amount of increase in the performance information before and after the movement of the virtual machine 11 on the basis of the performance information before and after the movement collected from the server device 10 (referred to as a current server device 10) on which the virtual machine 11 runs after the movement, and acquires this amount of increase as the performance information on this virtual machine 11 on the current server device 10.

As described above, if the virtual machine 11 has been moved at least once, it is possible to acquire the performance information on the virtual machine 11 on the current server device 10 on the basis of the amount of increase in the performance information on the virtual machine 11 on the current server device 10 in association with the movement of this virtual machine 11. However, in the case where the virtual machine 11 that has never been moved is judged as the target of movement, the amount of increase and the amount of decrease cannot be acquired. This means that, with the method described above, this performance information on the virtual machine 11 on the current server device 10 cannot be acquired. Thus, in the case where the virtual machine 11 that has never been moved is judged as the target of movement, the performance-information collecting unit 23, for example, applies component analysis to history data on the performance information on the host OS measured by the current server device 10, thereby estimating the performance information on the virtual machine 11 on the current server device 10. For the method of the component analysis, it is only necessary to use a known method such as an independent component analysis.

Further, in the case where judgment is made over movement of the virtual machine 11 that has been moved once, the plural combinations in the past of the workload amount and the workload characteristic value stored in the characteristic DB 28 are obtained through conversion from the performance information estimated as described above, and hence, the accuracy thereof is possibly reduced to some degree. Thus, it is desirable that the plural combinations concerning the previous server device 10 are acquired again on the basis of the performance information on the virtual machine 11 on the previous server device 10 obtained from the amount of increase in the performance information as described above after the movement of this virtual machine 11, and then, on the basis of these plural combinations, the plural combinations in the past are updated. With these processes, it is possible to obtain highly accurate information in the past to be used for judgment over movement of the virtual machine 11 that has been moved once.

It should be noted that, for the performance model in the preparation phase, it is only necessary to generate it in a similar manner to that in the first exemplary embodiment, using the performance information measured by the performance-information measuring unit 17 described above by causing each of the server devices 10 to run only the virtual machine 11 for measurement.

Operation and Effect of Second Exemplary Embodiment

As described above, in the second exemplary embodiment, for the performance information that cannot be acquired for each of the virtual machines 11, the performance information on the virtual machine 11 on the current server device 10 or the performance information on the virtual machine 11 on the previous server device 10 is calculated on the basis of the amount of increase or amount of decrease in the performance information on the host OS (integrated performance information on the group of the virtual machines in the predetermined unit) before and after movement of the virtual machine 11. After this, with the calculated performance information, the performance information on the virtual machine 11 in the destination of movement is estimated in a manner similar to that in the first exemplary embodiment. Thus, according to the second exemplary embodiment, it is possible to highly accurately estimate the performance of the virtual machine 11 in the destination of movement, even in the mode in which the performance information cannot be acquired for each of the virtual machines 11.

Example

With examples given below, the exemplary embodiments described above will be described in more detail. The examples described below do not apply any limitation on the present invention. Here, an example is given in which, in a state where a virtual machine 11 having the performance information with the CPU utilization percentage of 50% is running on a server device 10 (#1), this virtual machine 11 is moved from the server device 10 (#1) to a server device 10 (#2).

The conversion unit 31 in the virtual-machine managing device 20 extracts the performance model of the server device 10 (#1) from the model DB 27, and by using this performance model, converts the performance information (percentage of CPU used of 50%) on the virtual machine 11 on the server device 10 (#1) into plural combinations of the workload amount and the workload characteristic value.

Figure 7:
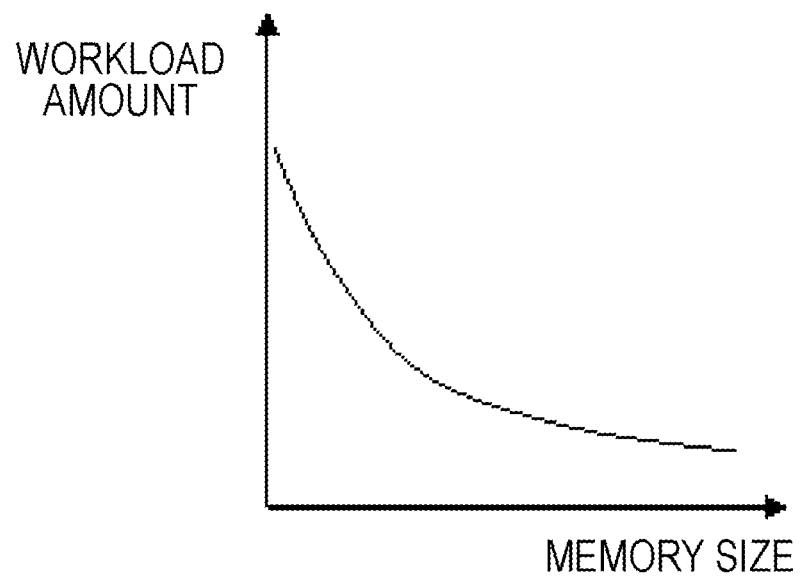
FIG. 7 is a diagram illustrating an example of plural combinations of the workload amount and the workload characteristic value converted using the performance model concerning a current server device.

FIG. 7 is a diagram illustrating an example of plural combinations of the workload amount and the workload characteristic value converted using the performance model of the server device 10 (#1). In the example illustrated in FIG. 7, the memory size is used as the workload characteristics, and the continuous data are used as data indicating these plural combinations. As described above, by using only the performance information on the virtual machine 11 on the server device 10 (#1) on which the virtual machine 11 is currently running, it is difficult to specify one combination of the workload amount and the workload characteristic value corresponding thereto.

Here, it is assumed that the server device 10 (#2) serving as a candidate for the destination of movement has reduced CPU clock and has increased cache as compared with the server device 10 (#1). If plural combinations obtained using the performance model of the server device 10 (#1) are given as an input to the performance model of the server device 10 (#2) as illustrated in FIG. 7 as an example, for example, plural pieces of performance information as illustrated in FIG. 8 as an example can be acquired.

Figure 8:
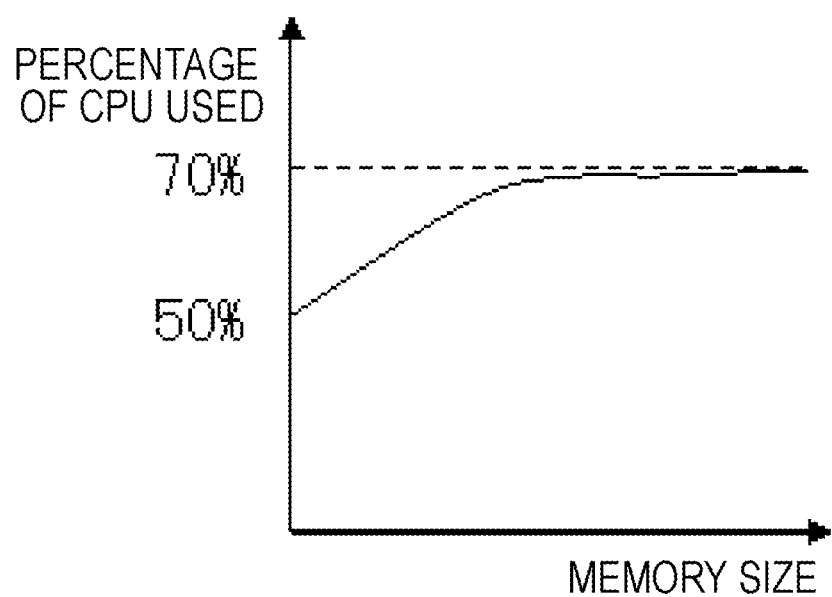
FIG. 8 is a diagram illustrating an example of performance information on a virtual machine on a destination server device.

FIG. 8 is a diagram illustrating an example of performance information on the virtual machine 11 on the server device 10 (#2) serving as the destination of movement. In the case where the memory size used in processes performed in the virtual machine 11 is small, the performance improves due to an effect of the CPU cache, and hence, the difference between the performance on the server device 10 (#1) and the performance on the server device 10 (#2) decreases. As illustrated in FIG. 8, the CPU utilization percentage of 50% on the server device 10 (#1) varies in the range of 50% to 70% on the server device 10 (#2) depending on the combination of the workload amount and the workload characteristic value. However, this size of memory used cannot be observed, and hence, it is not known exactly.

For these reasons, the estimating unit 32 determines that the performance information on the virtual machine 11 on the server device 10 (#2) is a value that falls in the range of 50% to 70%, or is 70%, which is the maximum value in this range. With this process, if the server device 10 (#2) has the available CPU utilization percentage corresponding to the values estimated as described above, it is possible to move the virtual machine 11 to the server device 10 (#2). As described above, in the case where the past data on the virtual machine 11 are not stored in the characteristic DB 28, it may be possible to employ a configuration in which, rather than the conversion unit 31 selecting one combination from among the plural combinations converted from the performance model of the server device 10 (#1), the estimating unit 32 estimates the performance information on this virtual machine 11 on the server device 10 (#2), serving as the destination of movement of this virtual machine 11, from the range of the performance information obtained by applying these plural combinations to the performance model of the server device 10 (#2), serving as the destination of movement.

Figure 9:
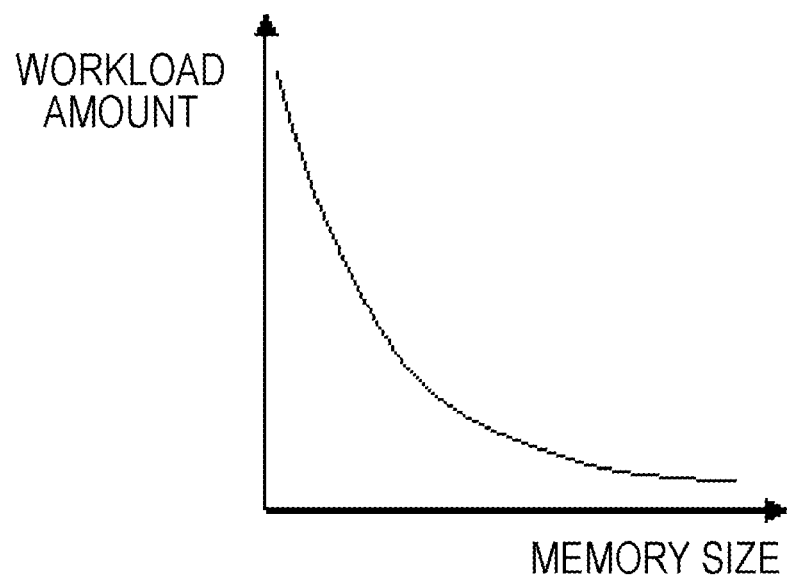
FIG. 9 is a diagram illustrating an example of plural combinations of the workload amount and the workload characteristic value converted using a performance model concerning a destination server device.

Here, it is assumed that the performance information on this virtual machine 11 on the server device 10 (#2) is the CPU utilization percentage of 65%, and further, the plural combinations of the workload amount and the workload characteristic value corresponding to the CPU utilization percentage of 65% in the performance model of the server device 10 (#2) are as shown in FIG. 9. FIG. 9 is a diagram illustrating an example of plural combinations of the workload amount and the workload characteristic value converted using the performance model of the server device 10 (#2).

Figure 10:
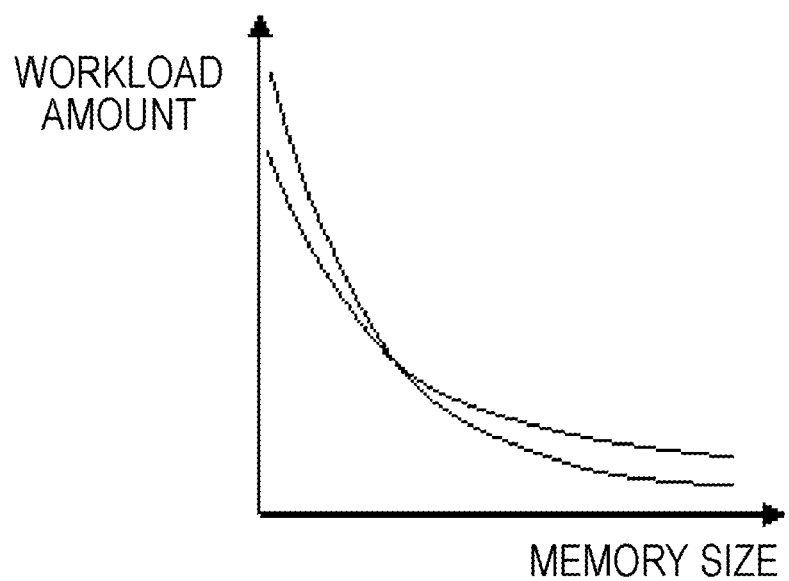
FIG. 10 is a graph illustrating a distribution obtained by superimposing the distribution of FIG. 7 on the distribution of FIG. 9.

In this case, if this virtual machine 11 is further moved to the server device 10 (#3), the plural combinations acquired in connection with the server device 10 (#1) (FIG. 7) and the plural combinations acquired in connection with the server device 10 (#2) (FIG. 9) are used. FIG. 10 is a graph showing a distribution obtained by superimposing the distribution of FIG. 7 on the distribution of FIG. 9.

The conversion unit 31 determines the intersecting point of two distributions shown in FIG. 10 to be one combination of the workload amount and the workload characteristic value concerning this virtual machine 11. After this, at the time of moving the virtual machine 11, this combination determined is used as data indicating the performance of this virtual machine 11, whereby it is possible to highly accurately estimate the performance information on the virtual machine 11 at the destination of movement.

Modification Example

Each of the exemplary embodiments described above gives an example in which the virtual-machine managing device 20 includes the performance DB 26, the model DB 27, and the characteristic DB 28 (see FIG. 2). However, it may be possible to employ a configuration in which these databases are included in another device in the virtual-machine managing system 1, and the virtual-machine managing device 20 accesses these databases on this other device. Further, in each of the exemplary embodiments described above, the server device 10 that runs the virtual machine 11 and the virtual-machine managing device 20 are separately provided. However, all or part of the configuration of the virtual-machine managing device 20 may be disposed on the server device 10. For example, it may be possible to employ a configuration in which the model generating unit 33 and the model DB 27 are disposed on each of the server devices 10, and each of the server devices 10 generates and stores the performance model of the server device 10 itself.

It should be noted that, in the plural flowcharts used in the descriptions above, plural steps (processes) are described in a sequential order. However, the order of the process steps performed in the exemplary embodiments is not limited to the order of the steps described. In the exemplary embodiments, the order of the process steps illustrated in the drawings may be exchanged, provided that the exchange does not impair the details of the processes. Further, the above-described exemplary embodiments and the modification example may be combined, provided that the details thereof do not contradict each other.

Part or all of the exemplary embodiments and the modification example described above can be described in a manner illustrated in the Supplementary Notes below. However, the exemplary embodiments and the modification example are not limited to the descriptions below.

(Supplemental Note 1)

The virtual-machine managing device including:

a model acquiring unit that acquires, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices;

a performance-information acquiring unit that acquires the performance information on a virtual machine to be moved running on a current server device;

a conversion unit that converts the performance information on the virtual machine to be moved into a combination of the workload amount and the workload characteristic value concerning the virtual machine to be moved, by using the performance model of the current server device; and an estimating unit that estimates performance information on the virtual machine to be moved in case of running on a destination server device serving as a candidate for a destination of movement of the virtual machine to be moved, by applying the combination converted by the conversion unit to the performance model of the destination server device.

(Supplemental Note 2)

The virtual-machine managing device according to Supplemental Note 1, further including:

a workload controlling unit that causes a virtual machine for measurement, which is arranged on each of the server devices in order to execute a designated workload, to sequentially execute plural workloads corresponding to plural combinations of the workload amount and the workload characteristic value;

a performance-information collecting unit that collects performance information concerning each of the workloads on each of the server devices, the performance information measured by causing each of the workloads to be executed on each of the server devices; and a model generating unit that generates the performance model of each of the server devices on the basis of a correspondent relationship between each of the combinations of the workload amount and the workload characteristic value and the performance information concerning each of the workloads.

(Supplemental Note 3)

The virtual-machine managing device according to Supplemental Note 1 or 2, in which the conversion unit applies the performance information on the virtual machine to be moved to the performance model of the current server device to acquire plural combinations of the workload amount and the workload characteristic value concerning the virtual machine to be moved, and determines, from the plural combinations, one combination as a result of conversion of the performance information on the virtual machine to be moved.

(Supplemental Note 4)

The virtual-machine managing device according to any one of Supplemental Notes 1 to 3, further including:

a characteristic-information storage unit that stores first plural combinations of the workload amount and the workload characteristic value concerning the virtual machine to be moved, the first plural combinations obtained by applying performance information on the virtual machine to be moved on a previous server device, on which this virtual machine to be moved previously ran, to the performance model of this previous server device, in which the conversion unit applies the performance information on the virtual machine to be moved to the performance model of the current server device to acquire second plural combinations of the workload amount and the workload characteristic value concerning the virtual machine to be moved, and determines one combination as a result of conversion of the performance information on the virtual machine to be moved, from the second plural combinations and the first plural combinations stored in the characteristic-information storage unit.

(Supplemental Note 5)

The virtual-machine managing device according to any one of Supplemental Notes 1 to 4, in which in the case where the virtual machine to be moved moves to the current server device from a previous server device on which the virtual machine to be moved previously ran, the performance-information acquiring unit acquires the performance information on the virtual machine to be moved on the current server device on the basis of an amount of increase in integrated performance information on a group of virtual machines in a predetermined unit running on the current server device, or acquires the performance information on the virtual machine to be moved on the previous server device on the basis of an amount of decrease in integrated performance information on a group of virtual machines in a predetermined unit running on the previous server device.

(Supplemental Note 6)

The virtual-machine managing device according to any one of Supplemental Notes 1 to 5, in which the performance model indicates, for each of plural resource types, plural correspondent relationships among the workload amount, the workload characteristic value, and performance information on the workload, the performance-information acquiring unit acquires the performance information on the virtual machine to be moved, this performance information relating to each of the plural resource types, the conversion unit converts the performance information on each of the resource types for the virtual machine to be moved, into a combination of the workload amount and the workload characteristic value for each of the resource types for the virtual machine to be moved, by using the performance model relating to each of the resource types, and the estimating unit estimates performance information on each of the resource types for the virtual machine to be moved on the destination server device.

(Supplemental Note 7)

A virtual-machine managing system including the virtual-machine managing device according to any one of Supplemental Notes 1 to 6 and plural server devices, in which each of the plural server devices includes:

a performance-information measuring unit that measures performance information on a virtual machine running on the server device itself, or integrated performance information on a group of virtual machines in a predetermined unit running on the server device itself.

(Supplemental Note 8)

A virtual-machine managing method performed by at least one computer and including:

acquiring, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices;

acquiring the performance information on a virtual machine to be moved running on a current server device;

converting the performance information on the virtual machine to be moved into a combination of the workload amount and the workload characteristic value concerning the virtual machine to be moved, by using the performance model of the current server device; and estimating performance information on the virtual machine to be moved in case of running on a destination server device serving as a candidate for a destination of movement of the virtual machine to be moved, by applying the converted combination to the performance model of the destination server device.

(Supplemental Note 9)

The virtual-machine managing method according to Supplemental Note 8 performed by the at least one computer and further including:

causing a virtual machine for measurement, which is arranged on each of the server devices in order to execute a designated workload, to sequentially execute plural workloads corresponding to plural combinations of the workload amount and the workload characteristic value;

collecting performance information concerning each of the workloads on each of the server devices, the performance information measured by causing each of the workloads to be executed on each of the sever devices; and generating the performance model of each of the server devices on the basis of a correspondent relationship between each of the combinations of the workload amount and the workload characteristic value and the performance information concerning each of the workloads.

(Supplemental Note 10)

The virtual-machine managing method according to Supplemental Note 8 or 9, in which the conversion includes:

applying the performance information on the virtual machine to be moved to the performance model of the current server device to acquire plural combinations of the workload amount and the workload characteristic value concerning the virtual machine to be moved; and determining, from the plural combinations, one combination as a result of conversion of the performance information on the virtual machine to be moved.

(Supplemental Note 11)

The virtual-machine managing method according to any one of Supplemental Notes 8 to 10 performed by the at least one computer and further including:

storing first plural combinations of the workload amount and the workload characteristic value concerning the virtual machine to be moved, the first plural combinations obtained by applying performance information on the virtual machine to be moved on a previous server device, on which the virtual machine to be moved previously ran, to the performance model of the previous server device, in which the conversion includes:

applying the performance information on the virtual machine to be moved to the performance model of the current server device to acquire second plural combinations of the workload amount and the workload characteristic value concerning the virtual machine to be moved; and determining one combination as a result of conversion of the performance information on the virtual machine to be moved, from the second plural combinations and the first plural combinations.

(Supplemental Note 12)

The virtual-machine managing method according to any one of Supplemental Notes 8 to 11, in which in the case where the virtual machine to be moved moves to the current server device from a previous server device on which the virtual machine to be moved previously ran, the acquisition of the performance information on the virtual machine to be moved includes:

acquiring the performance information on the virtual machine to be moved on the current server device on the basis of an amount of increase in integrated performance information on a group of virtual machines in a predetermined unit running on the current server device, or acquiring the performance information on the virtual machine to be moved on the previous server device on the basis of an amount of decrease in integrated performance information on a group of virtual machines in a predetermined unit running on the previous server device.

(Supplemental Note 13)

The virtual-machine managing method according to any one of Supplemental Notes 8 to 12, in which the performance model indicates, for each of plural resource types, plural correspondent relationships among the workload amount, the workload characteristic value, and performance information on the workload, the acquisition of the performance information on the virtual machine to be moved includes acquiring the performance information on the virtual machine to be moved, this performance information relating to each of the plural resource types, the conversion includes converting the performance information on each of the resource types for the virtual machine to be moved, into a combination of the workload amount and the workload characteristic value for each of the resource types on the virtual machine to be moved, by using the performance model relating to each of the resource types, and the estimation includes estimating performance information on each of the resource types for the virtual machine to be moved on the destination server device.

(Supplemental Note 14)

A program that causes at least one computer to realize:

a model acquiring unit that acquires, for each server device, a performance model indicative of plural correspondent relationships among a workload amount, a workload characteristic value serving as a parameter of a workload, the parameter having an effect on a performance for the workload, and performance information on the workload measured by causing the workload corresponding to the workload amount and the workload characteristic value to be executed on each of the server devices;

a performance-information acquiring unit that acquires the performance information on a virtual machine to be moved running on a current server device;

a conversion unit that converts the performance information on the virtual machine to be moved into a combination of the workload amount and the workload characteristic value concerning the virtual machine to be moved, by using the performance model of the current server device; and an estimating unit that estimates performance information on the virtual machine to be moved in case of running on a destination server device serving as a candidate for a destination of movement of the virtual machine to be moved, by applying the combination converted by the conversion unit to the performance model of the destination server device.

(Supplemental Note 15)

The program according to Supplemental Note 14 that causes the at least one computer to further realize:

a workload controlling unit that causes a virtual machine for measurement, which is arranged on each of the server devices in order to execute a designated workload, to sequentially execute plural workloads corresponding to plural combinations of the workload amount and the workload characteristic value;

a performance-information collecting unit that collects performance information concerning each of the workloads on each of the server devices, the performance information measured by causing each of the workloads to be executed on each of the server devices; and a model generating unit that generates the performance model of each of the server devices on the basis of a correspondent relationship between each of the combinations of the workload amount and the workload characteristic value and the performance information concerning each of the workloads.

(Supplemental Note 16)

The program according to Supplemental Note 14 or 15, in which the conversion unit applies the performance information on the virtual machine to be moved to the performance model of the current server device to acquire plural combinations of the workload amount and the workload characteristic value concerning the virtual machine to be moved, and determines, from the plural combinations, one combination as a result of conversion of the performance information on the virtual machine to be moved.

(Supplemental Note 17)

The program according to any one of Supplemental Notes 14 to 16 that causes the at least one computer to further realize:

a characteristic-information storage unit that stores first plural combinations of the workload amount and the workload characteristic value concerning the virtual machine to be moved, the first plural combinations obtained by applying performance information on the virtual machine to be moved on a previous server device, on which the virtual machine to be moved previously ran, to the performance model of the previous server device, in which the conversion unit applies the performance information on the virtual machine to be moved to the performance model of the current server device to acquire second plural combinations of the workload amount and the workload characteristic value concerning the virtual machine to be moved, and determines one combination as a result of conversion of the performance information on the virtual machine to be moved, from the second plural combinations and the first plural combinations stored in the characteristic-information storage unit.

(Supplemental Note 18)

The program according to any one of Supplemental Notes 14 to 17, in which in the case where the virtual machine to be moved moves to the current server device from a previous server device on which the virtual machine to be moved previously ran, the performance-information acquiring unit acquires the performance information on the virtual machine to be moved on the current server device on the basis of an amount of increase in integrated performance information on a group of virtual machines in a predetermined unit running on the current server device, or acquires the performance information on the virtual machine to be moved on the previous server device on the basis of an amount of decrease in integrated performance information on a group of virtual machines in a predetermined unit running on the previous server device.

(Supplemental Note 19)

The program according to any one of Supplemental Notes 14 to 18, in which the performance model indicates, for each of plural resource types, plural correspondent relationships among the workload amount, the workload characteristic value, and performance information on the workload, the performance-information acquiring unit acquires performance information on the virtual machine to be moved, this performance information relating to each of the plural resource types, the conversion unit converts the performance information on each of the resource types for the virtual machine to be moved, into a combination of the workload amount and the workload characteristic value for each of the resource types for the virtual machine to be moved, by using the performance model relating to each of the resource types, and the estimating unit estimates performance information on each of the resource types for the virtual machine to be moved on the destination server device.

(Supplemental Note 20)

A storage medium that records the program according to any one of Supplemental Notes 14 to 19 in a manner to be readable by a computer.

The present application claims priority based on Japanese Patent Application No. 2012-052028 filed in Japan on Mar. 8, 2012, the disclosures of which are incorporated herein by reference in their entirety.

The invention claimed is:

1. A virtual-machine managing method performed by at least one computer and including:

acquiring a performance model for each physical server device of a plurality of physical server devices, the performance model indicating associations between a plurality of combinations of workload parameters and an amount of resources of one of the physical server devices consumed by a workload configured with the combination of the workload parameters associated therewith, wherein a processing load on the physical server device depends on the combination of the plurality of the workload parameters with which the workload is configured;

acquiring performance information on a target virtual machine running on a first physical server device, the performance information on the target virtual machine running on the first physical server device indicating an amount of resources of the first physical server device consumed by the target virtual machine, the target virtual machine running the workload and being moved onto a second physical server device;

converting the amount of resources indicated by the performance information on the target virtual machine running on the first physical server device into one of a first plurality of combinations of the workload parameters that is associated, by the performance model of the first physical server device, with the amount of resources indicated by the performance information on the target virtual machine running on the first physical server device;

estimating an amount of resources of the second physical server device expected to be consumed in a case of that the target virtual machine runs on the second physical server device, the amount of resources of the second physical server device expected to be consumed being estimated as the amount of resources of the second physical server device associated, by the performance model of the second physical server device, with the combination of the plurality of the workload parameters obtained as a result of the conversion;

storing a second plurality of combinations of the workload parameters, which is associated with an amount of resources of a third physical server device that the target virtual machine consumed when the target virtual machine ran on the third physical server device in a past; obtaining a common set of the first plurality of combinations of the workload parameters and the second plurality of combinations of the workload parameters, and converting the amount of resources indicated by the performance information on the target virtual machine running on the first physical server device into one of the plurality of combinations of the workload parameters included in the obtained common set; and moving the target virtual machine to the second physical server device.

2. A virtual-machine managing device, comprising:

a model acquiring unit that acquires a performance model for each physical server device of a plurality of physical server devices, the performance model indicating associations between a plurality of combinations of workload parameters and an amount of resources of one of the physical server devices consumed by a workload configured with the combination of the workload parameters associated therewith, wherein a processing load on the physical server device depends on the combination of the plurality of the workload parameters with which the workload is configured;

a performance-information acquiring unit that acquires performance information on a target virtual machine running on a first physical server device, the performance information on the target virtual machine running on the first physical server device indicating an amount of resources of the first physical server device consumed by the target virtual machine, the target virtual machine running the workload and being moved onto a second physical server device;

a conversion unit that converts the amount of resources indicated by the performance information on the target virtual machine running on the first physical server device into one of a first plurality of combinations of the workload parameters that is associated, by the performance model of the first physical server device, with the amount of resources indicated by the performance information on the target virtual machine running on the first physical server device;

an estimating unit that estimates an amount of resources of the second physical server device expected to be consumed in a case of that the target virtual machine runs on the second physical server device, the amount of resources of the second physical server device expected to be consumed being estimated as the amount of resources of the second physical server device associated, by the performance model of the second physical server device, with the combination of the plurality of the workload parameters obtained as a result of the conversion performed by the conversion unit; and a characteristic-information storage unit that stores a second plurality of combinations of the workload parameters, which is associated with an amount of resources of a third physical server device that the target virtual machine consumed when the target virtual machine ran on the third physical server device in a past, wherein the conversion unit obtains a common set of the first plurality of combinations of the workload parameters and the second plurality of combinations of the workload parameters, and converts the amount of resources indicated by the performance information on the target virtual machine running on the first physical server device into one of the plurality of combinations of the workload parameters included in the obtained common set, and wherein the target virtual machine is moved to the second physical server device.

3. The virtual-machine managing device according to claim 2, further comprising:

a workload controlling unit that causes a virtual machine for measurement, which is arranged on each of the physical server devices, to execute a plurality of workloads, each of the workloads being configured with a different one of a plurality of combinations of the workload parameters;

a performance-information collecting unit that collects workload performance information on each workload running on each physical server device, the performance information on a workload running on a physical server device indicating an amount of resources of the physical server device consumed by the workload; and a model generating unit that generates the performance model of each of the server devices on the basis of a plurality of correspondences between the plurality of combinations of the workload parameters and the workload performance information on each workload running on each physical server device.

4. The virtual-machine managing device according to claim 2, wherein in a case where the target virtual machine was moved from the third physical server device onto the first physical server device, the target virtual machine having been running on the third physical server device, the performance-information acquiring unit acquires the performance information on the target virtual machine running on the first physical server device on the basis of an increase of a total amount or resources indicated by pieces of the performance information on a group of virtual machines in a predetermined unit running on the first physical server device, or acquires the performance information on the target virtual machine running on the first physical server device on the basis of a decrease of a total amount or resources indicated by the pieces of the performance information on a group of virtual machines in a predetermined unit running on the first physical server device.

5. The virtual-machine managing device according to claim 2, wherein the performance model indicates the associations between the plurality of combinations of the workload parameters and the amount of resources of the first physical server device consumed by a workload configured with the combination of the workload parameters, for each of a plurality of types of resources of the first physical server device, wherein the performance-information acquiring unit acquires the performance information on the target virtual machine running on the first physical server device, for each of the plurality of types of resources of the first physical server device, wherein the conversion unit converts, for each of the plurality of types of resources of the first physical server device, the amount of resources indicated by the performance information on the target virtual machine running on the first physical server device into one of the first plurality of combinations of the workload parameters, using the performance model of the first physical server device for each of the plurality of types of resources of the first physical server device, and wherein the estimating unit estimates the amount of resources of the second physical server device expected to be consumed in a case of that the target virtual machine runs on the second physical server device, for each of the plurality of types of resources of the second physical server device.

6. A virtual-machine managing system comprising the virtual-machine managing device according to claim 2 and a plurality of server devices, wherein each of the plurality of server devices includes:

a performance-information measuring unit that measures performance information on a virtual machine running on one of the physical server devices, or integrated performance information on a group of virtual machines in a predetermined unit running on the one of the physical server devices.

7. A non-transitory computer-readable storage medium storing a program for causing at least one computer to realize:

a model acquiring unit that acquires a performance model for each physical server device of a plurality of physical server devices, the performance model indicating associations between a plurality of combinations of workload parameters and an amount of resources of one of the physical server devices consumed by a workload configured with the combination of the workload parameters associated therewith, wherein a processing load on the physical server device depends on the combination of the plurality of the workload parameters with which the workload is configured;

a performance-information acquiring unit that acquires performance information on a target virtual machine running on a first physical server device, the performance information on the target virtual machine running on the first physical server device indicating an amount of resources of the first physical server device consumed by the target virtual machine, the target virtual machine running the workload and being moved onto a second physical server;

a conversion unit that converts the amount of resources indicated by the performance information on the target virtual machine running on the first physical server device into one of a first plurality of combinations of the workload parameters that is associated, by the performance model of the first physical server device, with the amount of resources indicated by the performance information on the target virtual machine running on the first physical server device;

an estimating unit that estimates an amount of resources of the second physical server device expected to be consumed in a case of that the target virtual machine runs on the second physical server device, the amount of resources of the second physical server device expected to be consumed being estimated as the amount of resources of the second physical server device associated, by the performance model of the second physical server device, with the combination of the plurality of the workload parameters obtained as a result of the conversion performed by the conversion unit; and a characteristic-information storage unit that stores a second plurality of combinations of the workload parameters, which is associated with an amount of resources of a third physical server device that the target virtual machine consumed when the target virtual machine ran on the third physical server device in a past, wherein the conversion unit obtains a common set of the first plurality of combinations of the workload parameters and the second plurality of combinations of the workload parameters, and converts the amount of resources indicated by the performance information on the target virtual machine running on the first physical server device into one of the plurality of combinations of the workload parameters included in the obtained common set, and wherein the target virtual machine is moved to the second physical server device.

\* \* \* \* \*